United States Patent [19]

Pollard

[11] 3,737,759

[45] June 5, 1973

[54] STATIC SWITCH INCLUDING SURGE SUPPRESSING MEANS

[75] Inventor: Ernest M. Pollard, Cherry Hill, N.J.

[73] Assignee: General Electric Company, Philadelphia, Pa.

[22] Filed: Mar. 1, 1972

[21] Appl. No.: 230,559

[52] U.S. Cl. .................................. 321/45 C
[51] Int. Cl. ............................... H02m 7/00
[58] Field of Search .................. 321/43, 44, 45 C

[56] References Cited

UNITED STATES PATENTS

| | | | |
|---|---|---|---|
| 3,242,352 | 3/1966 | Long | 307/252 M X |
| 3,133,209 | 5/1964 | Greenwood et al. | 307/252 M |
| 3,074,030 | 1/1963 | Hierholzer, Jr. | 321/45 C |
| 3,193,733 | 7/1965 | Orsino | 307/252 M X |

Primary Examiner—William M. Shoop, Jr.
Attorney—J. Wesley Haubner and Barry A. Stein

[57] ABSTRACT

Disclosed is a forced commutation static switch composed of inverse parallel connected thyristors. Commutation circuits are respectively connected across the thyristors. Means for suppressing commutation generated switching transients are coupled to a portion of the commutation means, and means for suppressing external voltage surges are coupled to another portion of the commutation means.

2 Claims, 1 Drawing Figure

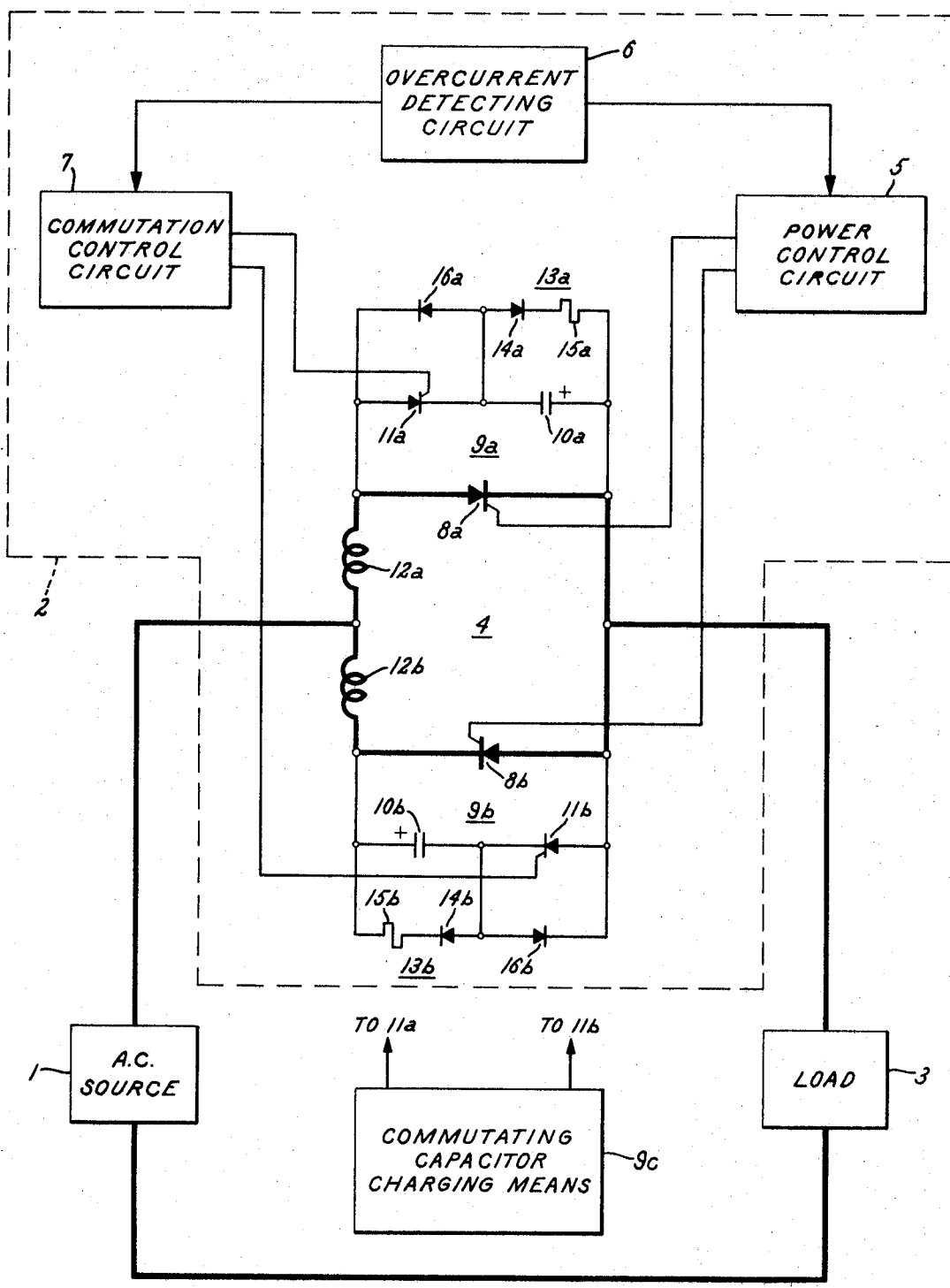

STATIC SWITCH INCLUDING SURGE SUPPRESSING MEANS

BACKGROUND AND OBJECTS OF THE INVENTION

This invention relates to forced commutation static switches which are adapted to be connected to an electric power circuit for selectively permitting or blocking the flow of alternating current therein. More particularly, this invention relates to a thyristor-composed-AC switch including commutation means selectively operative for interrupting current through the switch and voltage surge suppression means.

The following published art now known to the applicant, are exemplary of prior art approaches which may be relevant in this area of technology: U.S. Pat. No. 2,233,416-Klemperer; U.S. Pat. No. 3,133,290-Greenwood et al.; U.S. Pat. No. 3,566,150-Nollage; and German Pat. No. 1,262,434.

In the art of electric power distribution and utilization it is a common practice to employ switches or circuit breakers in order to initiate or terminate the flow of load current on command from the control circuit. These switches may advantageously be constructed of solid state controllable switching devices such as thyristors. A silicon controlled rectifier (SCR) is one type of thyristor useful in such switches. Since thyristor switches do not utilize any moving parts for circuit completion or interruption, they are known in the art as static switches. Static switches may be provided with overcurrent protective means to enable them to interrupt the flow of load current in response to a sensed overcurrent of a preselected magnitude. As is well known, an SCR comprises a body of semi-conductor material having a plurality of layers of alternately P and N type conductivities which form a plurality of back-to-back rectifying junctions therein. The semi-conductor body is disposed between a pair of main electrodes one known as the anode and the other as the cathode. Thyristors additionally include some form of gating means (e.g., in a conventional SCR it is the gate) which is operative for initiating current conduction between the anode and cathode. When connected to a source of voltage and a load, an SCR will ordinarily block appreciable current flow between its anode and cathode until triggered or fired by a signal to its gate at a time when its anode is biased positive with respect to its cathode, whereupon it abruptly switches to a relatively low resistance, conductive state. Once conducting, the SCR will continue to conduct load current even if no further triggering is provided, so long as the magnitude of the current is above the predetermined holding level. When the magnitude of current drops below that level, the SCR switches to a relatively high resistance state whereupon the flow of load current is blocked until the SCR is subsequently retriggered. Therefore when connected to an AC power source an SCR will necessarily cease conducting at the occurrence of a natural current zero.

SCR's are unidirectional controlled switches, therefore in an AC power distribution system they are normally connected in an inverse parallel configuration to form a static switch having a pair of conducting paths (one path conducts positive or forward half cycles of load current and the other path conducts negative or reverse half cycles of the load current). A control circuit is normally provided for supply gate signals to the switch or power SCR's to initiate conduction therein. The control circuit includes means for effectuating load current interruption in response to a sensed fault or overcurrent. This may be accomplished by stopping the supply of gate signals from the control circuit, whereupon the switch or the power SCR's would commence blocking load current at the occurrence of the next natural current zero. It should be noted that this manner of current interruption may allow the fault current to build up to dangerous levels before the conducting switch regains its blocking state at the next current zero following the fault current's detection.

In order to provide current interruption capability within a fraction of a half cycle of the alternating source voltage, means must be provided to force the conducting power SCR off (i.e., return it to its blocking state). The process of turning off the conducting power SCR is known in the art as forced commutation or simply commutation. A static switch equipped with commutation means for interrupting current within a fraction of a half cycle of the detection of a fault is known as a current limiting switch. Such a switch limits the magnitude of the fault current to an acceptable maximum by interrupting the fault current early in its half cycle (i.e., before it reaches its peak magnitude).

The commutating means can take a variety of forms which are well known in the art. One commonly used commutating circuit comprises a charged capacitor connected in series with a thyristor (the thyristor is known in the art as a commutating thyristor and the capacitor is known as a commutating capacitor). This circuit is connected in shunt across the power SCR of the static switch. The commutating thyristor is poled in the same direction as the power SCR and is normally in a nonconductive state. The commutating capacitor is charged to a predetermined DC voltage in opposition to the polarity of the power thyristor and is isolated from the power thyristor by the nonconducting commutating thyristor. When a fault current whose magnitude exceeds a preselected level is detected in the system, the commutating thyristor is triggered on by its control circuit. This allows the charged commutating capacitor to discharge in the reverse direction through the conducting power thyristor. The commutating capacitor discharge serves to reverse bias the power thyristor and drive the current flowing through it below its holding level, whereupon it turns off (resumes its blocking state).

As is known in the art, when thyristors switch from their conducting to their blocking states on the incidence of a current zero, voltage transients (hereinafter called switching transients) are generated in the power circuit. In the case of a static switch being commutated off by the discharge of an associated commutating capacitor, the resulting switching transient appears on the commutating capacitor and is of opposite polarity to the voltage which the capacitor was charged for its commutation duty. If the switching transient is large, damage to the commutating capacitor may result.

The possibility of switching-transient-induced-damage to the commutating capacitors of a static switch can be minimized by including surge suppression circuitry in the switch. One particularly effective switching transient suppression circuit includes a resistor connected in series with a diode. That circuit is connected in shunt across the commutating capacitor with its diode poled in the same direction as the commutating thyristor. When connected in this manner the transient produced as the power thyristor switches off is transferred to the suppression circuit where it is dissipated in the resistor.

When the power thyristors of the static switch are in their nonconducting state (i.e., are blocking the flow of current to the load) if a severe, externally originated, voltage surge occurs, damage to the reverse-poled, nonconducting power thyristors may result. One possible approach for protecting the power thyristors from damage in such an event is to render the commutating thyristors conductive to permit the surge to pass through the switch (via the commutating thyristors and the switching transient suppression circuit) to the load. One significant draw-back of such an approach is that the load is exposed to not only the external voltage surge but also to the voltage which is placed on the commutating capacitor for commutation duty. That combined voltage, when passed to the load, may damage the load absent other protective circuitry. Another drawback to the above approach is the need for circuitry to sense the surge and to render the commutating thyristors conductive in response thereto.

It is a general object of my invention to provide a forced commutation static switch including improved means operative for protecting the switch from both switching transients and externally produced-voltage surges.

It is a further object of my invention to provide means coupled to a forced commutation static switch which is effective for protecting the switch from external voltage surges and which decreases the magnitude of the voltage surge passed on to the load.

It is a further object of my invention to provide means coupled to a forced commutation static switch which is effective for protecting the switch from external surges and which may serve as a means of charging the commutating capacitors for their commutation duty.

SUMMARY OF THE INVENTION

In accordance with one form of my invention I provide a current limiting static switch adapted to be connected between a voltage source and a load and including voltage surge protection circuitry.

The switch is made up of at least two power thyristors connected in inverse parallel relationship with one another to form a pair of conducting paths (one path for conducting positive polarity current and the other path for conducting negative polarity current).

Commutation circuits are respectively connected in shunt with the conducting paths for rendering the power thyristors thereof nonconductive upon command. Each commutation circuit includes a commutating capacitor connected in series with a normally nonconductive commutating thyristor. Circuitry is provided to charge the commutating capacitors in each commutation circuit.

Damping circuits are respectively coupled to the commutating capacitors in the switch. The damping circuits serve to absorb and dissipate any switching created transients and thus protect the commutating capacitors from the voltage transients produced as the power thyristors are commutated off.

The static switch also includes means to protect the power thyristors from externally produced, reverse voltage surges which may arise at a time when both of the power thyristors are in their nonconductive states. Such means are respectively coupled to the commutating capacitors in a manner which effectively shunts the surge from the nonconducting power thyristor to the load while reducing its magnitude.

BRIEF DESCRIPTION OF THE DRAWING

This invention will be better understood in its various objects and advantages will be more fully appreciated from the following description taken in conjunction with the accompanying drawing which is a schematic diagram of a power system utilizing a static switch in accordance with my invention.

DETAILED DESCRIPTION OF THE PREFERRED EMBODIMENT OF THE INVENTION

As can be seen, an alternating voltage source 1 is arranged to supply electric power to a load 3. In order to initiate or terminate the flow of current to the load a static circuit breaker 2 is provided between the source and the load. This circuit breaker includes a solid state or static switch 4. Although only a single-phase switch is shown, it will be understood that two more duplicate switches would be used in a typical 3-phase static breaker. In order to control conduction of the static switch, i.e., to initiate or to terminate current conduction therein, the breaker also includes a control circuit 5 having two states or modes, namely "ON" and "OFF." When the control circuit is actuated from its ON to its OFF states the static switch interrupts the flow of current to the load. Further, the breaker includes commutation means to force commutate the static switch in high-speed response to the detection of a fault current by an overcurrent detecting circuit 6. The commutation means are controlled by commutation control circuit 7.

The static switch 4 comprises a pair of power thyristors 8a and 8b connected in inverse parallel relationship with one another to form two conducting paths through which load current may flow.

Control circuit 5, in its ON mode, provides suitable gate signals to power thyristors 8a and 8b to render the switch conductive, whereupon load current is enabled to flow between the source 1 and the load 3 in either direction. In its OFF mode no gate signals are provided by the power control circuit 5 to any of the switch power thyristors. Hence, when control circuit 5 is in this mode the static switch 4 blocks the flow of load current.

Static circuit breaker 2 is of the current limiting type and is therefore equipped with means for rapidly forcing all the conducting power thyristors OFF in response to a sensed fault. That means includes a pair of commutation circuits 9a and 9b. Commutation circuit 9a includes a commutating capacitor 10a and a serially connected commutating thyristor 11a. Commutation circuit 9b includes a commutating capacitor 10b and a serially connected commutating thyristor 11b. As shown, commutation circuit 9a is connected in shunt with power thyristor 8a. The commutating thyristor 11a is normally nonconductive and is poled in the same direction as its associated power thyristor 8a. In a similar manner commutation circuit 9b is connected in shunt with power thyristor 8b with its normally nonconductive commutating thyristor 11b poled in the same direction as the associated power thyristor 8b. Although each commutating thyristor may be identical to its associated power thyristor, it is desirable to utilize commutating thyristors having a lower steady state power rating than the power thyristors since the former will be required to handle switching currents for only a short period of time. Higher forward blocking voltage capability is also required of the commutating thyristor, as is the ability to handle high rates of rise of inrush current.

Each commutating capacitor in the commutating circuits 9a and 9b is charged to a DC voltage level, the polarity of which is shown, by commutating capacitor charging means 9c. Such means is shown in functional block form in the interests of drawing simplicity. In practice it is preferably constructed in accordance with the teachings found in U.S. Pat. No. 3,098,949-Goldberg.

When a fault occurs, current flowing in the switch increases abnormally. When the magnitude of fault current attains a preselected level, overcurrent detecting circuit 6 is actuated and immediately provides a "stop" signal to the power control circuit 5 and to the commutation control circuit 7. Upon receipt of a "stop" signal, control circuit 5 ceases producing gate signals for the power thyristors. In response to the same event, commutation control circuit 7 is arranged to supply a trigger signal to the commutating thyristors. Upon receipt of trigger signals at their gates the commutating thyristors commence conducting whereupon the energy stored in their associated commutating capacitors begins flowing in the reverse direction through the fault-current-conducting power thyristor.

If both commutating thyristors 11a and 11b are triggered into conduction at the same time, the energy stored in the commutating capacitor associated with a nonconducting power thyristor would be available to forward bias the conducting power thyristor and thus detract from the reverse biasing action of the commutating capacitor associated with a conducting power thyristor. To prevent such an occurrence, a pair of decoupling inductors 12a and 12b are connected in each load current conducting path as shown. The use of decoupling inductors to effectuate the commutation process is proposed in U.S. Pat. No. 3,558,983 (Steen) and assigned to the same assignee as my invention.

Another approach to ensuring that commutation proceeds successfully once it has begun is to utilize discrimination means to actuate only the commutation thyristor associated with the fault current carrying power thyristor. Such a discriminatory approach is shown and claimed in copending U.S. Pat. application Ser. No. 76,446 (Steen) filed on Sept. 29, 1970, and assigned to the same assignee as my invention.

I wish to make it clear that while I have shown the use of decoupling inductors to effectuate successful commutation I also contemplate the use of discrimination means in lieu thereof. In fact a combination of both approaches may also be used.

The flow of current in the reverse direction through the fault current carrying power thyristor acts to quench conduction therethrough, and the power thyristor quickly returns to its nonconductive state. At this time the fault current switches to the associated conducting commutating thyristor. Each commutation circuit includes a sufficient amount of inductance (not shown) so that the current flowing therethrough is oscillatory in nature. Accordingly, at the occurrence of the current zero the commutation thyristor in the commutation circuit ceases conducting and all load current through the switch ceases. The above described commutation sequence can occur within a few hundred microseconds from the time a fault current which is permitted to flow can be limited to an acceptable magnitude (i.e., well below the available peak fault current magnitude) by the very rapid response of the static circuit breaker 2.

As can be seen in the drawing, a switching-surge-suppressing circuit 13a is connected in shunt with commutating capacitor 10a, and a similar circuit 13b is connected in shunt with commutating capacitor 10b. The switching surge suppressing circuit 13a comprises a unipolarity conducting element or diode 14a connected in series with an energy dissipating element or resistor 15a. In a similar manner circuit 13b comprises a diode 14b connected in series with a resistor 15b. The diode in each of the switching-surge-suppressing circuits is poled in opposition to the polarity of the voltage normally appearing on the shunted commutating capacitor so that the energy stored therein will not be diverted to the surge suppressing circuit during the process of commutation.

Operation of the surge suppressing circuits will be considered below with regard to the commutation of power thyristor 8a. Absent the surge suppressing circuit 13a, as power thyristor 8a turns off, a switching voltage transient, resulting from the switching of a fault current to the conducting commutating thyristor 11a, would appear on the discharging commutating capacitor 10a with reverse polarity compared to the initial charge. If the magnitude of the transient were high enough, damage to the commutating capacitor or to power thyristor 8a could result. However, the switching surge suppressing circuit 12 effectively limits such a build up of reverse voltage, and any excessive energy in the switching transient, instead of overstressing the commutating capacitor 10a, will pass through diode 14a to resistor 15a to be safely dissipated therein.

When connected in a typical power system, a static switch may occasionally be subjected to an externally produced-voltage surge (e.g., lightning striking a system conductor) at a time when the switch is in its OFF mode (i.e., the power thyristors are in their nonconducting state). If the surge is severe and if the power system lacks surge suppressing circuitry, damage to reverse-poled, nonconducting, power thyristors may result.

It should be noted herein that the switching transient suppressing circuits 13a and 13b can be used to protect the nonconducting power thyristors from externally generated voltage surges by triggering the commutation thyristors conductive in response to the detection of the surge so as to insert the suppressing circuits in the path through which the surge will pass. However this scheme has certain short-comings. A preferred scheme for protecting the nonconducting power thyristors from externally produced voltage surges will now be described.

As can be seen the static switch 4 includes means adapted for protecting the breaker's nonconducting power thyristors from externally produced surges without exposing the load to unreasonably large voltages. The means utilized is relatively simple and inexpensive and comprises a unipolarity conducting element or diode which is connected in shunt with each commutation thyristor. For example, a diode 16a is connected in shunt with commutating thyristor 11a and a diode 16b is connected in shunt with commutating thyristor 11b. Each diode is poled in opposition to the commutating thyristor which it shunts.

Operation of the external voltage surge protecting means 16a and 16b will be understood from the following example, assuming that the control circuit 5 of the static switch 4 is in its "OFF" mode and that a voltage surge of positive polarity appears on the source side of the static circuit breaker 2. Absent the voltage surge protecting means 16b, the positive polarity surge would appear across nonconducting power thyristor 8b in the reverse direction (i.e., cathode to anode). If the surge is sufficiently large, damage to the power thyristor may result. However, the use of diode 16b provides the surge with a path shunting the reverse-poled-power thyristor 8b through which the surge may pass. That path includes the charged commutated capacitor 10b and diode 16b. In the short period of time during which the surge exists the shunt path formed by the capacitor 10b and diode 16b appears as a short circuit (neglecting the forward voltage drop across the diode). Accordingly, the shunt path effectively prevents the application of the surge voltage to the nonconducting power thyristor.

It should be appreciated that in shunting the surge away from the power thyristor 8b, the diode-capacitor path necessarily allows the surge to pass onto the load. If the commutating capacitor is in an uncharged state the magnitude of the surge appearing at the load is substantially undiminished. However, owing to the fact that the capacitor is normally in a charged state for its commutation duty and that the voltage thereon is in opposition to the voltage surge, the voltage to which the load is subjected is equal to the surge voltage minus the voltage on the commutating capacitor.

It should therefore be appreciated that my manner of external surge suppression is not only accomplished via simple circuitry but also has the advantage of reducing the voltage of the surge that appears at the load.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A forced commutation static switch adapted to be connected between a voltage source and an electric power load comprising:
   a. a first thyristor switchable from a nonconductive state to a load current conducting state;
   b. commutation means connected in shunt with said first thyristor and adapted for rendering said first thyristor nonconductive upon command, said commutation means comprising:
      i. a second thyristor poled in the same direction as said first thyristor; and
      ii. a commutating capacitor in series with said second thyristor;
   c. charging means for charging said commutating capacitor to a voltage in the polarity tending to forward bias said second thyristor and reverse bias said first thyristor; and
   d. means separate from said charging means for protecting said first thyristor from reverse voltage surges when said first thyristor is nonconductive, said last mentioned means comprising a unipolarity conducting element connected in shunt with said second thyristor and poled in opposition thereto.

2. A forced commutation static switch adapted to be connected between a voltage source and an electric power load comprising:
   a. a first thyristor switchable from a nonconductive state to a load current conducting state;
   b. commutation means connected in shunt with said first thyristor and adapted for rendering said first thyristor nonconductive upon command, said commutation means comprising:
      i. a second thyristor poled in the same direction as said first thyristor; and
      ii. a commutating capacitor in series with said second thyristor;
   c. charging means for charging said commutating capacitor to a voltage in the polarity tending to forward bias said second thyristor and reverse bias said first thyristor;
   d. means for limiting the magnitude of the recovery voltage transient appearing across said first thyristor when it is rendered nonconductive by said commutation means, said transient magnitude limiting means being connected in shunt with said commutating capacitor and including:
      i. a resistor; and
      ii. a first unipolarity conducting element poled in the same direction as said first and second thyristors; and
   e. means separate from said charging means for protecting said first thyristor from reverse voltage surges when said first thyristor is nonconductive, said means comprising a second unipolarity conducting element connected in shunt with said second thyristor and poled in opposition thereto.

* * * * *